(12) United States Patent
Hangari (10) Patent No.: US 10,263,496 B2
(45) Date of Patent: Apr. 16, 2019

(54) COOLING APPARATUS FOR AN ELECTRIC MACHINE

(71) Applicant: Wolong Electric America LLC, Chicago, IL (US)

(72) Inventor: Vishwanath U. Hangari, Hyderabad (IN)

(73) Assignee: WOLONG ELECTRIC AMERICA LLC, Chicago, IL (US)

( * ) Notice: Subject to any disclaimer, the term of this patent is extended or adjusted under 35 U.S.C. 154(b) by 123 days.

(21) Appl. No.: 15/420,902

(22) Filed: Jan. 31, 2017

(65) Prior Publication Data

US 2018/0219454 A1   Aug. 2, 2018

(51) Int. Cl.
| H02K 9/06 | (2006.01) |
| H02K 5/20 | (2006.01) |
| H02K 9/04 | (2006.01) |
| H02K 5/18 | (2006.01) |

(52) U.S. Cl.
CPC ............ *H02K 9/06* (2013.01); *H02K 5/20* (2013.01); *H02K 9/04* (2013.01); *H02K 5/18* (2013.01)

(58) Field of Classification Search
CPC .. H02K 9/06; H02K 9/04; H02K 9/02; H02K 5/20; H02K 5/18
USPC ............... 310/64, 60 A, 89, 58–59
See application file for complete search history.

(56) References Cited

U.S. PATENT DOCUMENTS

| 2006/0055254 A1* | 3/2006 | Pellegrino | H02K 5/20 310/58 |
| 2008/0100159 A1* | 5/2008 | Dawsey | H02K 1/20 310/54 |
| 2012/0222844 A1 | 9/2012 | Gardas et al. | |
| 2014/0021812 A1* | 1/2014 | Hashish | H02K 9/14 310/63 |
| 2016/0276902 A1* | 9/2016 | Heidebrink | H02K 9/04 |

OTHER PUBLICATIONS

U.S. Appl. No. 15/439,214, filed Feb. 22, 2017, Hangari, et al.

* cited by examiner

*Primary Examiner* — Michael Andrews
(74) *Attorney, Agent, or Firm* — Eckert Seamans Cherin & Mellott, LLC (57) ABSTRACT

Provided is a cooling apparatus for an electric machine that is integrally combined with the cover of the electric machine and includes a body portion around the circumference of an external surface of the cover that has a first part which is formed at a first angle in a direction away from the cover, and a second part which is formed in a second angle in a downward direction which is opposite the direction of the first part, wherein the first part and the second part form an opening therebetween. The body portion is formed above a plurality of fins attached to a frame of the electric machine, wherein the fresh air is introduced into the fins and mixes with air from an air inlet end and exits through an air outlet end at the opposite end of each fin of the plurality of fins.

22 Claims, 7 Drawing Sheets

COOLING APPARATUS FOR AN ELECTRIC MACHINE

TECHNICAL FIELD

The present invention relates generally to a cooling apparatus for an electric machine. In particular, the present invention relates to a cooling apparatus to further enhance cooling and performance of the electric machine utilizing a Venturi effect.

BACKGROUND

A machine, such as an electric motor (e.g., a totally-enclosed fan-cooled motor), typically does not allow outside air to freely circulate through an interior of the motor. An external fan or blower is often attached to one end of the motor and the air is blown over the body surface or fins of the motor to cool it.

Using convention cooling methods, the heat generated, for example, due to losses in the motor during operation, are generally kept within allowable limits. However, these conventional cooling methods suffer from temperature gradients from a fan end to another end (e.g., exit end) which restricts the operation of the motor and the maximum achievable rating.

SUMMARY OF THE EMBODIMENTS

Given the aforementioned deficiencies, a need exists for a more efficient cooling apparatus and cooling process of electric machines (e.g., motors).

Under certain circumstances, embodiments of the present invention provides a cooling apparatus for an electric machine which employs the Venturi effect that occurs when the air is flowing through the fins and is forced through an opening in the frame to enhance the cooling process of the electric machine. The Venturi effect is created by guiding air between fins by a cover placed above fins and reducing the air flow path area between fins at certain distance from fan end using embodiments and thus increasing the velocity of air. An opening next to the high velocity zone on the cover would allow the fresh air to enter and mix with the air coming from the fan.

An embodiment of the present invention includes a cooling apparatus for an electric machine that is integrally combined with the cover of the electric machine. The cooling apparatus includes a body portion around the circumference of an external surface of the cover that has a first part which is formed at a first angle in a direction away from the cover, and a second part which is formed in a second angle in a downward direction which is opposite the direction of the first part, wherein the first part and the second part form an opening therebetween. The body portion is formed above a plurality of fins attached to a frame of the electric machine, wherein the fresh air is introduced into the fins and mixes with air from an air inlet end and exits through an air outlet end at the opposite end of each fin of the plurality of fins.

According to yet another embodiment, a cooling apparatus is provided that includes a plurality of body portions spaced apart around the circumference of an external surface of the cover and each body portion having a first part which is formed at a first angle in a direction away from the cover, and a second part which is formed in a second angle in a downward direction which is opposite the direction of the first part, wherein the first part and the second part form an opening therebetween. Each body portion is formed above a plurality of fins attached to a frame of the electric machine, wherein the fresh air is introduced into the fins simultaneously at each body portion, and mixes with air from an air inlet end and exits through an air outlet end at the opposite end of each fin of the plurality of fins.

According to yet another embodiment, a cooling apparatus is provided that includes a blower disposed at a center of the cover and introducing air into a plurality of fins attached to a frame of the electric machine; and a plurality of body portions spaced apart on opposite sides of the blower and around the circumference of an external surface of the cover and each body portion having a first part which is formed at a first angle in a direction away from the cover, and a second part which is formed in a second angle in a downward direction which is opposite the direction of the first part, wherein the first part and the second part form an opening therebetween. Each body portion is formed above a plurality of fins attached to a frame of the electric machine, wherein the fresh air is introduced into the fins simultaneously at each body portion, and mixes with air from an air inlet end and exits through an air outlet end at the opposite end of each fin of the plurality of fins.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide a cooling apparatus that is implemented within an electric machine (e.g., a totally-enclosed fan-cooled (TEFC) electric motor). The cooling apparatus employs the Venturi effect, and mixes the air coming from the external fan attached to the electric motor with fresh air at an ambient temperature to reduce the mixed air temperature of the motor and increases the volume of air which is guided to an air outlet at the fan end of the frame of the motor resulting in the reduction of air temperature at the air outlet. Therefore, the component temperature is reduced to optimize the maximum rating of the motor. The Venturi effect is created by guiding air between fins by a cover placed above fins and reducing the air flow path area between fins at certain distance from fan end using embodiments and thus increasing the velocity of air. An opening next to the high velocity zone on the cover would allow the fresh air to enter due to the Venturi effect and mix with the air coming from fan.

Figure 1:
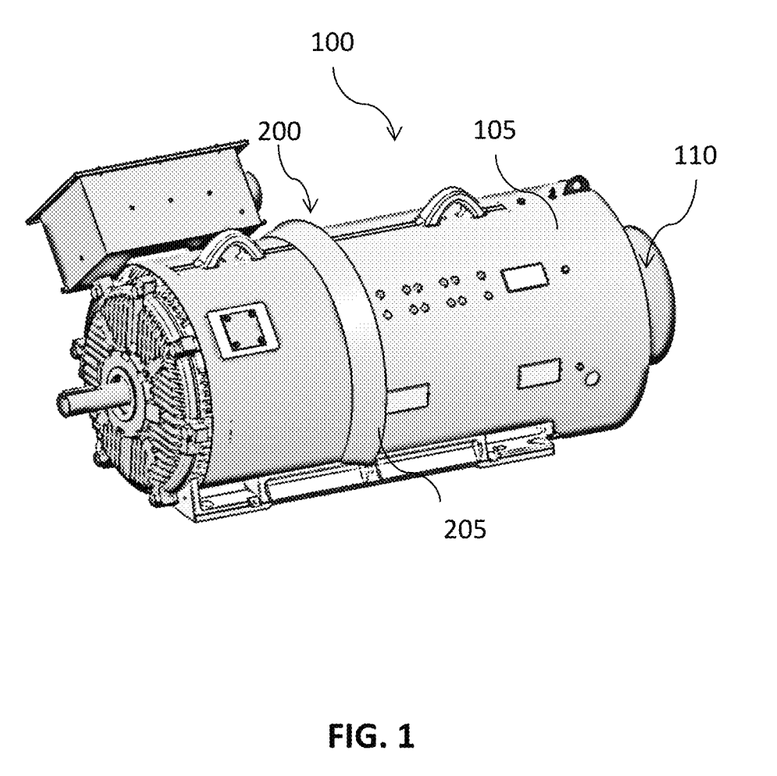
FIG. 1 is a schematic illustrating an electric machine including a cooling apparatus that can be implemented within one or more embodiments of the present invention.

FIG. 1 is a schematic illustrating an electric machine 100 including a cooling apparatus 200 that can be implemented within one or more embodiments of the present invention. The electric machine 100 is a totally-enclosed fan-cooled (TEFC) electric motor. The cooling apparatus 200 can be implemented within any type of electric machine or other machine requiring cooling down to maintain performance thereof.

The electric machine 100 includes is enclosed by a cover 105 and includes a fan 110 connected at one end thereof. The cover 105 includes the cooling apparatus 200. The cooling apparatus 200 is integrally combined with the cover 105 along an external surface thereof. Additional details regarding the cooling apparatus 200 will be discussed with reference to FIGS. 2A through 10.

Figure 2A:
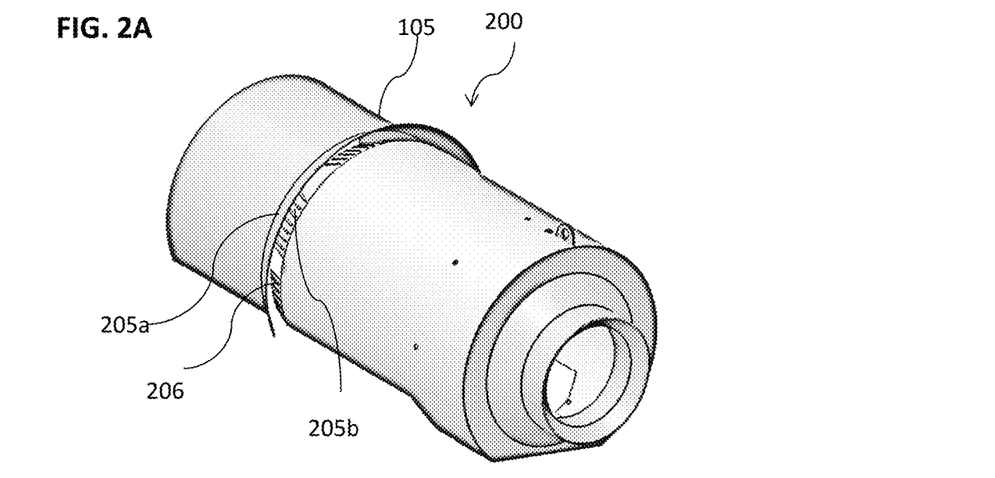
FIGS. 2A and 2B are schematics illustrating the cooling apparatus that can be implemented within one or more embodiments of the present invention.
Figure 2B:
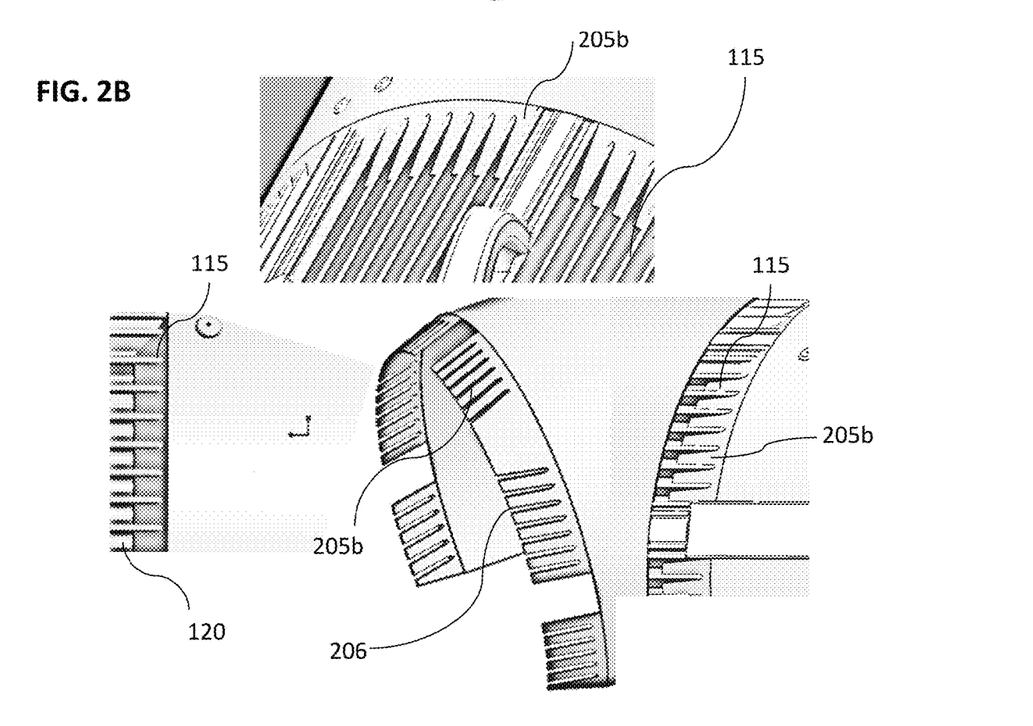

As shown in FIG. 2A, the cooling apparatus 200 includes a body portion 205 which is a cone-shaped portion around the circumference of the external surface of the cover 105. The body portion 205 includes a first part 205a which is a solid portion formed at an angle away from the cover 105 and a second part 205b which includes slots 206 angled in a downward direction which is opposite the direction of the first part 205a and are disposed in between the fins 115 formed along the frame on an outer surface of the electric machine 200 (as depicted in FIG. 2B).

Figure 3:
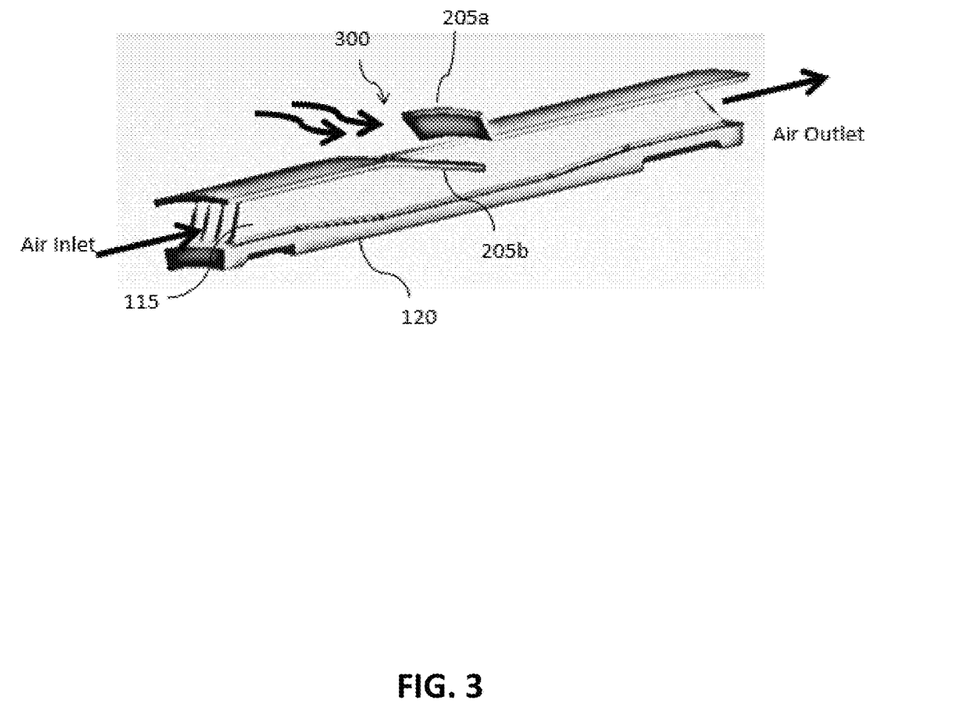
FIG. 3 is a perspective drawing illustrating the cooling apparatus and cooling process that can be implemented within one or more embodiments of the present invention.

As further shown in FIG. 3, the first part 205a is angled in a direction away from the cover 105 as discussed above, and the second part 205b is fitted in between the fins 115 therefore creating an opening 300 to receive fresh air at an ambient temperature into the fins 115 as indicated by the arrows.

Figure 4:
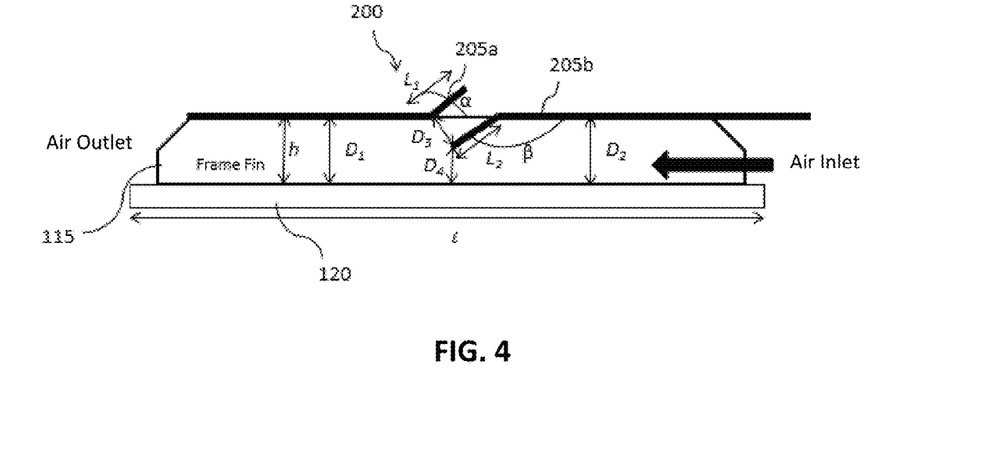
FIGS. 4 and 5 are schematics illustrating the cooling apparatus shown in FIGS. 2A and 2B, and the cooling processes that can be implemented within one or more embodiments of the present invention.

According to embodiments of the present invention, the first part 205a directs the air into the opening 300 by use of the angled surface thereof. The angle α can range between approximately 30 degrees to 60 degrees as shown in FIG. 4. The angle β of the second part 205b can range between approximately 120 degrees and 160 degrees. As the air from the fan 110 enters the fins 115 at an air inlet end as indicated by the arrow, and then combines with fresh air introduced through the opening 300. Example: Air temperature at the fan end inlet or fresh air inlet at 300 is at ambient temperature of say 40° C. Air temperature after 205b could be approximately 60°. Fresh air at 40° C. (at 300) and air at 60° C. after 205b mix together and may become ~50° (depends on the quantity of air entering from 205b and 300). The mixed air then travels through the remainder of each fin 115 and exits the air outlet at an opposite end. The mixture of fresh air with the air already traveling through the fins 115 is of a reduced temperature to thereby further remove the excess heat from the electric motor and enhance its performance.

There are several parameters which determine how the air will travel through the fins 115 as depicted in the Figures. These parameters include fin height (h), fin total length (l), the spacing between plurality of fins 115, angle α, angle β, the length of the first part 205a ($L_1$) and the length of the second part 205b ($L_2$), the distance from the first part 205a to the frame 120 ($D_1$) and the distance from the second part 205b to the frame 120 ($D_2$), the minimum distance from the angled part of first part 205a to the second part 205b ($D_3$), and the distance from the angled part of the second part 205b to the frame 120 ($D_4$) as shown in FIG. 4. In all embodiments, $D_4$ is less than $D_2$. In some embodiments, $D_1=D_2=h$ and in other embodiments, $D_1$ or $D_2>h$. The present invention is not limited to any particular arrangement and can vary accordingly to better enhance the air flow over and through the fins 115.

Figure 5:
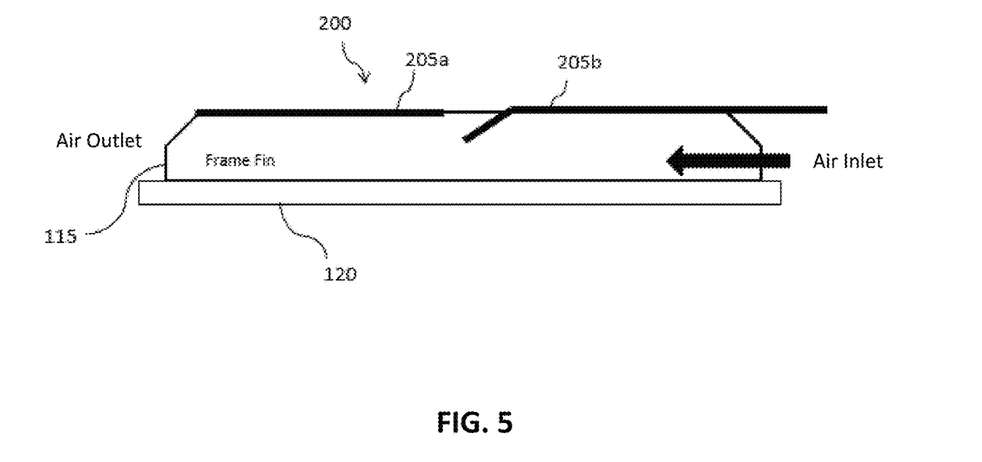

As shown in FIG. 5, according to another embodiment of the present invention, the part 205a can be omitted from the body portion 205. As shown, only part 205b is included in the body portion 205 and guides the fresh air into the opening 300 to mix with the air from the fan 110 and exit through the air outlet end. The present invention is not limited to the cooling apparatus 200 shown in FIGS. 2A through 5 and can be formed in accordance with the FIGS. 6A through 8 discussed below.

Figure 6A:
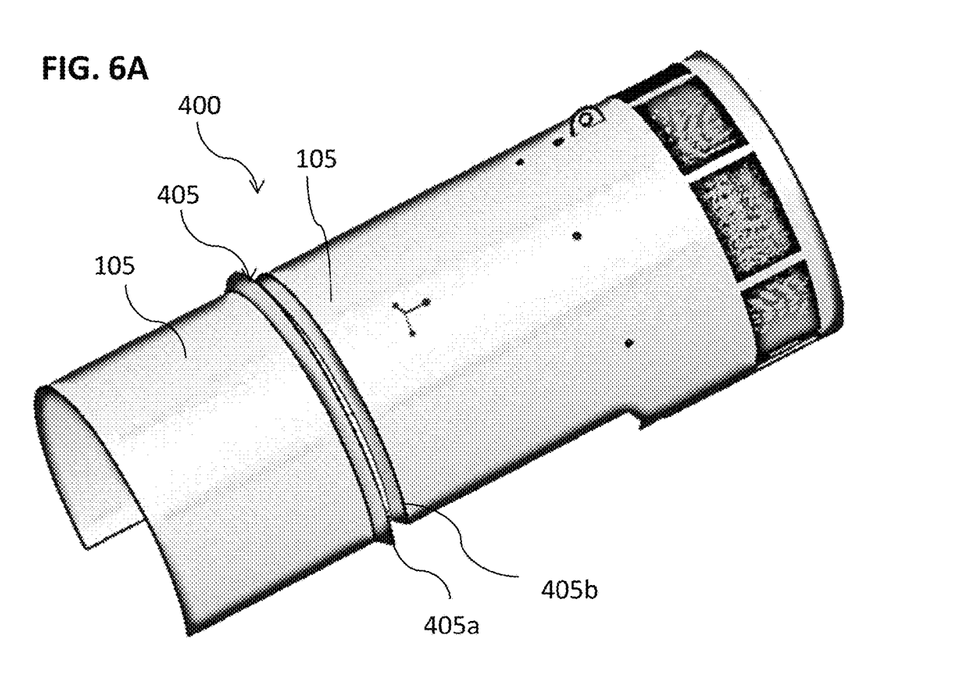
FIGS. 6A and 6B are schematics illustrating a cooling apparatus that can be implemented within one or more other embodiments of the present invention.
Figure 6B:
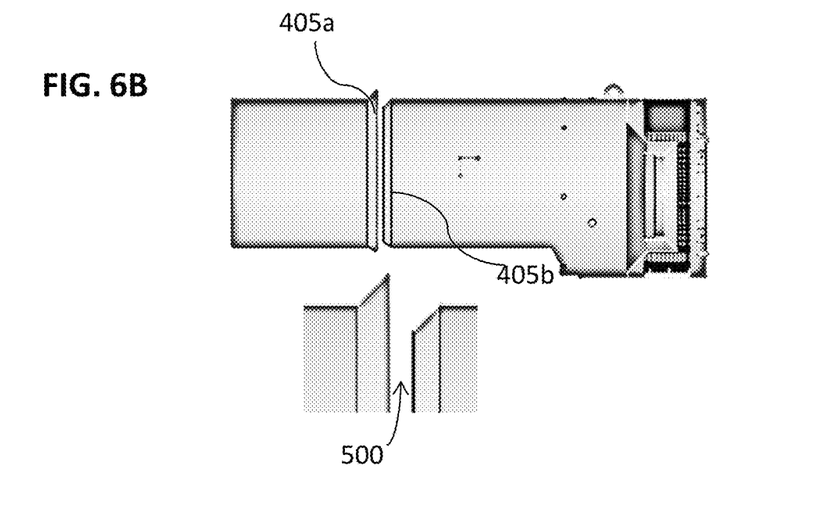
Figure 7A:
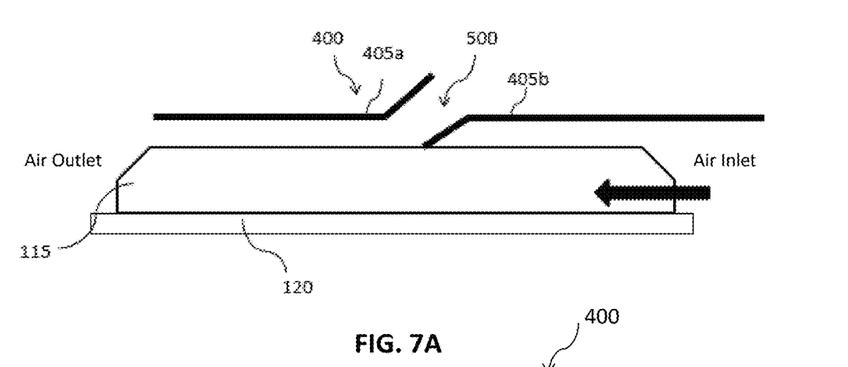
FIGS. 7A, 7B and 8 are schematics illustrating the cooling apparatus shown in FIGS. 6A and 6B, and the cooling processes that can be implemented within one or more embodiments of the present invention.
Figure 7B:
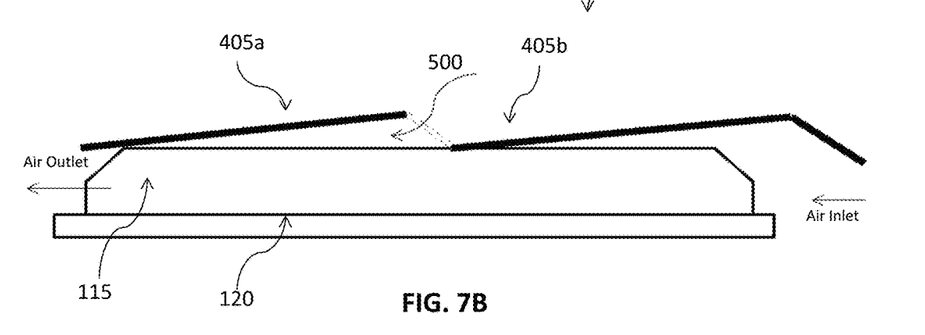
Figure 8:
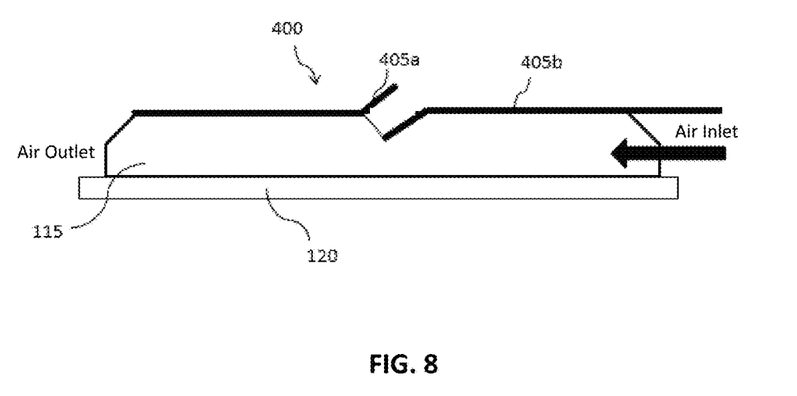

FIGS. 6A and 6B are schematics illustrating a cooling apparatus 400 that can be implemented within one or more other embodiments of the present invention. The cooling apparatus 400 includes a body portion 405 disposed around the circumference of the cover 105. According to this embodiment, the body portion 405 includes a first part 405a formed at an angle similar to the first part 205a (as depicted in FIG. 2A) and a second part 405b is angled downward but does not include slots and therefore is disposed on a top surface of the fin 115 as shown in FIGS. 7A, 7B and 8 discussed below. The first part 405b and the second part 405b create an opening 500 to allow fresh air to enter the fins 115 as shown in FIGS. 7A, 7B, and 8.

As shown in FIG. 7A, the cover 105 is a predetermined distance away from the fins 115 of the frame 120. Therefore, the opening 500 directs air above the fins 115 when mixed with the air introduced from the fan 110 at the air inlet end. The mixed air then travels along the remainder of the fin 115 and exits through the air outlet at the opposite end. In this embodiment, the first part 405a and the second part 405b are positioned above the fins 115 instead of within the fins 115 as shown in FIG. 8.

In FIG. 7B, the second part 405b is a conical part guiding air through the fins 115 coming from the fan 110 and increases air velocity at exit of the second part 405b and the first part 405a with openings 500 to allow fresh air to each fin 115 of the plurality of fins 115, and mixes with air in the fins 115 for the remainder of the fins 115 and exits through the air outlet.

FIG. 8 shows a the cooling apparatus 400 in accordance with another embodiment, whereby the body portion 405 rests on a top surface of the fins 115 and the air is introduced through the opening 500. That is, the body portion 405 is adjacent to the fins 115 such that the first part 405a sits on top of the fins 115 and the second part 405b is angled down into the fins 115.

Figure 9:
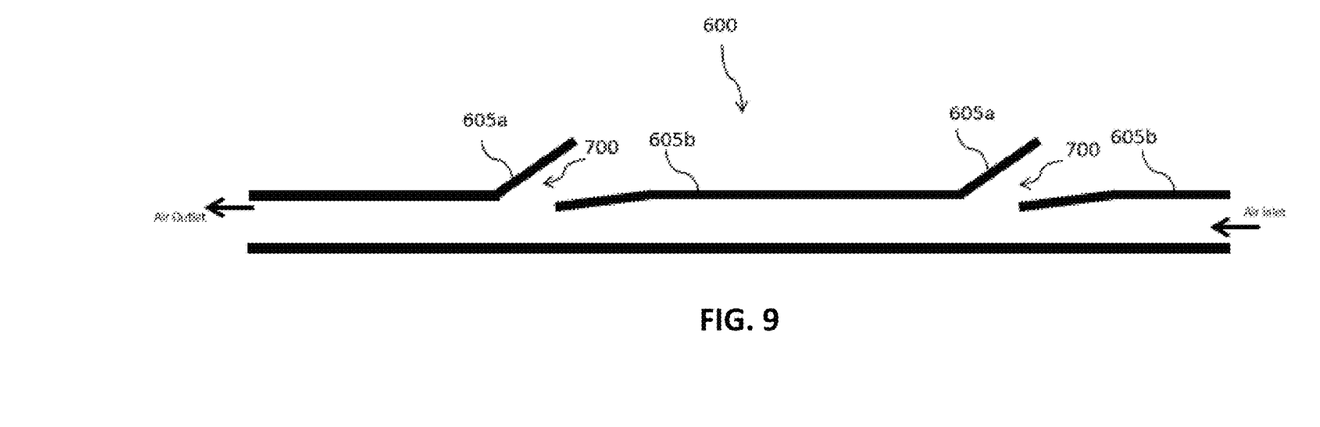
FIG. 9 is a schematic illustrating a cooling apparatus and process that can be implemented within another embodiment of the present invention.

FIG. 9 is a schematic illustrating a cooling apparatus 600 according to another embodiment of the present invention wherein there are multiple parts or pairs of 605a and 605b of the body portion 605 within the cover 105. The present invention is not limited to any particular number of body portions 605 and can vary accordingly. In this example, there are two (2) body portions 605 each having a first part 605a and a second part 605b. The body portions 605 work together to introduce fresh air into each opening 700 and allow air to mix with the air introduced into the air inlet to further enhance cooling of the air when heat from the electric machine 100 (as depicted in FIG. 1) is released. The mixed air then exits through the air outlet at the opposite end.

Figure 10:
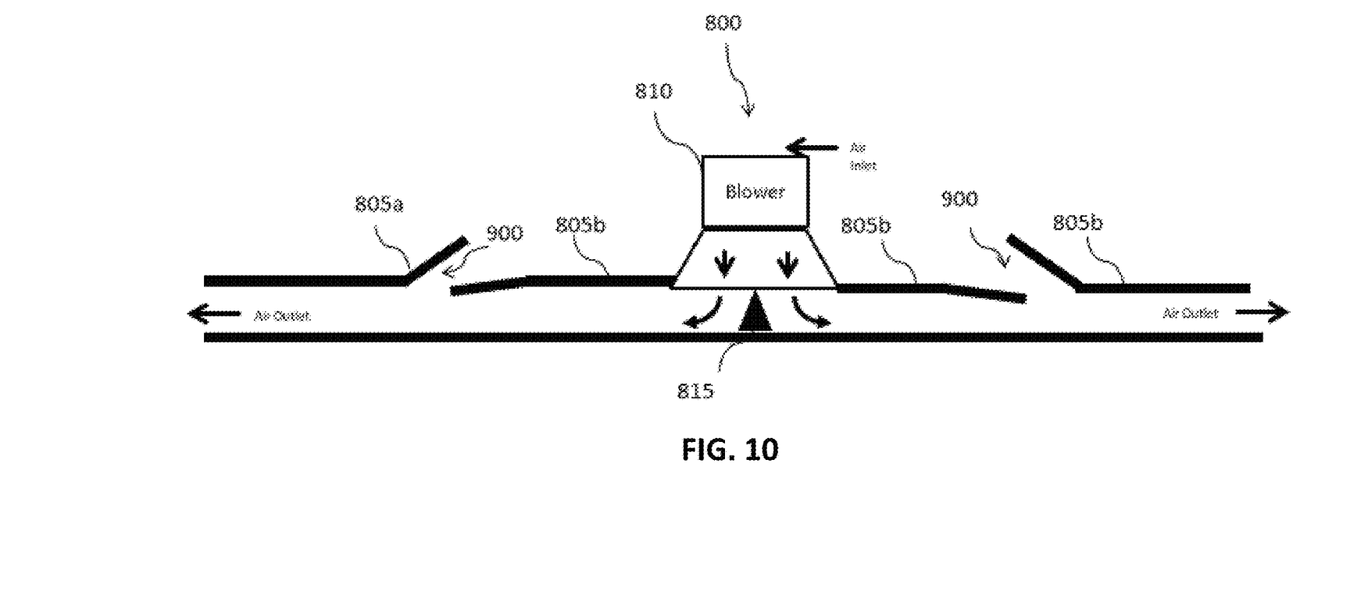
FIG. 10 is a schematic illustrating a cooling apparatus and process that can be implemented within yet another embodiment of the present invention.

FIG. 10 is a schematic illustrating a cooling apparatus 800 which includes a plurality of body portions 805 each having a first part 805a and a second part 805b and a blower 810 to further enhance the cooling process of the electric machine 100 (as depicted in FIG. 1). As shown, the blower 810 is disposed at a center of the cover 105 and introduces air into the fins 115 in two directions opposite each other via a splitter 815 disposed within each fin area to correspond to the location of the blower 810.

The body portions 805 are formed in a mirror formation on opposite sides adjacent to the blower 810 to introduce fresh air into the fins 115 in an opposite direction of each other through openings 900. Therefore, mixed air is released through separate air outlets formed at opposite ends of the fins 115. The present invention is not limited to any particular type of arrangement or number of body portions as shown in FIGS. 2A through 10 and can vary accordingly to further enhance the cooling process of the electric machine 100.

Embodiments of the present invention provide a cooling apparatus and process that increase the rating of the electric machine by reducing the maximum temperature to average temperature different. The reduction in air temperature thereby improves the reliability of the electric machine.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling apparatus for an electric machine that is integrally combined with a cylindrical cover of the electric machine to operate in conjunction with a fan attached to the electric machine, the cooling apparatus comprising:
    a body portion around the circumference of an external surface of the cover wherein the body portion is formed adjacent a plurality of radial fins attached to a frame of the electric machine, and comprising:
    a first part which is formed at a first angle in a direction away from the cover, and a second part which is formed in a second angle in a direction which is opposite the direction of the first part to increase the velocity of air coming from the fan between fins, wherein the first part and the second part form an opening therebetween to allow air to enter, and
    wherein the air is introduced into the fins and mixes with air from an air inlet end and exits through an air outlet end at the opposite end of each fin of the plurality of fins.

2. The cooling apparatus of claim 1, wherein the body portion is formed of a cone-shape around the circumference of the external surface of the cover.

3. The cooling apparatus of claim 1, wherein the second part includes a plurality of slots which are fitted between each fin of the plurality of fins to further introduce air in between each fin of the plurality of fins by increasing inlet velocity and creating a Venturi effect.

4. The cooling apparatus of claim 1, wherein the first angle is between 30 degrees and 60 degrees.

5. The cooling apparatus of claim 1, wherein the second angle is between 120 degrees and 160 degrees.

6. The cooling apparatus of claim 1, wherein the electric machine is a totally-enclosed fan-cooled electric motor wherein the fan is an external fan attached to an external end thereof, and air from the external fan is introduced into the fins and mixes with the air introduced through the opening to reduce a temperature of the electric motor, mixed air then travels through a remainder of each fin and exits through the air outlet.

7. The cooling apparatus of claim 6, wherein a distance from the first part to the frame and a distance from the second part to the frame are equal or higher than a radial height of each fin.

8. The cooling apparatus of claim 6, wherein a distance from distal end of the second part to the frame is less than a distance from a proximal end of the second part to the frame.

9. The cooling apparatus of claim 1, wherein the first angle is zero.

10. The cooling apparatus of claim 1, wherein the body portion is a predetermined distance from a top surface of each fin of the plurality of fins.

11. The cooling apparatus of claim 1, wherein the body portion rests on an outer surface of each fin of the plurality of fins and the second part is angled radially inwardly to increase the air velocity adjacent each fin to introduce air therein.

12. The cooling apparatus of claim 1, wherein the second part of the body portion is a conical part.

13. A cooling apparatus for an electric machine that is integrally combined with a cylindrical cover of the electric machine, the cooling apparatus comprising:
- a plurality of body portions spaced apart around the circumference of an external surface of the cover and each body portion comprising:
- a first part which is formed at a first angle in a direction away from the cover, and a second part which is formed in a second angle in a direction which is opposite the direction of the first part, wherein the first part and the second part form an opening therebetween, and the first part increases the air velocity corning from a fan and creates a Venturi effect, and
- wherein each body portion is formed adjacent a plurality of fins attached to a frame of the electric machine, wherein air is introduced into the fins simultaneously at each body portion, and mixes with air from an air inlet end and exits through an air outlet end at the opposite end of each fin of the plurality of fins.

14. The cooling apparatus of claim 13, wherein each body portion is formed of a cone-shape around the circumference of the external surface of the cover.

15. The cooling apparatus of claim 13, wherein the second part includes a plurality of slots which are fitted between each fin of the plurality of fins to further introduce air in between each fin of the plurality of fins.

16. The cooling apparatus of claim 13, wherein the first angle is between 30 degrees and 60 degrees.

17. The cooling apparatus of claim 13, wherein the second angle is between 120 degrees and 160 degrees.

18. The cooling apparatus of claim 13, wherein the electric machine is a totally-enclosed fan-cooled electric motor wherein the fan is an external fan attached to an external end thereof, and air from the external fan is introduced into the fins and mixes with the air introduced through the opening to reduce a temperature of the electric motor, mixed air then travels through a remainder of each fin and exits through the air outlet.

19. The cooling apparatus of claim 18, wherein a distance from the first part to the frame and a distance from the second part to the frame are equal to a radial height of each fin.

20. The cooling apparatus of claim 18, wherein a distance from a distal end of the second part to the frame is less than the distance from a proximal end of second part to the frame.

21. A cooling apparatus for an electric machine that is integrally combined with a cylindrical cover of the electric machine, the cooling apparatus comprising:
- a blower disposed radially outward of the cover and introducing air into a plurality of fins attached to a frame of the electric machine; and
- a plurality of body portions spaced apart on opposite sides of the blower and around the circumference of an external surface of the cover and each body portion comprising:
- a first part which is formed at a first angle in a direction away from the cover, and a second part which is formed in a second angle in a direction which is opposite the direction of the first part, wherein the first part and the second part form an opening therebetween, and
- wherein each body portion is formed adjacent a plurality of fins attached to a frame of the electric machine, wherein the velocity of air coming from the fan is increased to create a Venturi effect, wherein the air is introduced into the fins simultaneously at each body portion, and mixes with air from an air inlet end and exits through an air outlet end at the opposite end of each fin of the plurality of fins.

22. The cooling apparatus of claim 21, further comprising a splitter positioned within adjacent fin.

* * * * *